(12) United States Patent
Lewis et al.

(10) Patent No.: US 6,185,469 B1
(45) Date of Patent: Feb. 6, 2001

(54) METHOD AND APPARATUS FOR TESTING AND CONTROLLING A FLEXIBLE MANUFACTURING SYSTEM

(75) Inventors: Frank L. Lewis, Bedford; Diego A. Tacconi, Arlington, both of TX (US); Octavian C. Pastravanu, Iasi (RO); Ayla Gurel, Famagusta Via Mersin (TR)

(73) Assignee: Board of Regents, The University of Texas System, Austin, TX (US)

( * ) Notice: Under 35 U.S.C. 154(b), the term of this patent shall be extended for 0 days.

(21) Appl. No.: 09/076,043

(22) Filed: May 11, 1998

Related U.S. Application Data (60) Provisional application No. 60/047,985, filed on May 28, 1997.

(51) Int. Cl.$^7$ .................................................. G06F 17/16
(52) U.S. Cl. .............................. 700/99; 700/96; 700/101; 705/8
(58) Field of Search .................................... 700/108, 109, 700/96, 99, 101, 103, 104; 705/7, 8; 702/81, 82, 83, 182

(56) References Cited

U.S. PATENT DOCUMENTS

| | | | |
|---|---|---|---|
| 4,649,524 | * | 3/1987 | Vance ...................................... 367/13 |
| 4,914,615 | * | 4/1990 | Karmarkar et al. .................. 708/607 |
| 5,214,588 | * | 5/1993 | Kaneko et al. ....................... 700/113 |
| 5,257,363 | * | 10/1993 | Shapiro et al. ......................... 703/13 |
| 5,291,394 | * | 3/1994 | Chapman ................................ 705/8 |

(List continued on next page.)

OTHER PUBLICATIONS

Alayan, H. and Newcomb, R.W., Binary Petri–Net Relationships, *IEEE Transactions on Circuits and Systems*, vol. CAS–34, No. 5, pp. 565–568, May 1987.

Bodner et al., Object–Oriented Modeling and Simulation of Automated Control in Manufacturing, Proc. International Conference Robotics and Automation, vol. 3, pp. 83–88, May 1993.

Burman, D.Y., Gurrola–Gal, F.J., Nozari, A., Sathaye, S. and Sitarik, J.P., Performance Analysis Technniques for IC manufacturing Lines, *AT&T Technical Journal*, vol. 65, Issue 4, pp. 46–56, Jul./Aug. 1986.

Buzacott, J.A. and Yao, D.D., Flexible Manufacturing Systems: A Review of Analytical Models, *Management Science*, vol. 32, No. 7, Jul. 1986.

Cash, C.R., Wilhelm, W.E., A Simulation Model for Use in Designing Robotic Assembly Cells, *J. Manufacturing Systems*, vol. 7, No. 4, pp. 279–291, No Date.

(List continued on next page.)

*Primary Examiner*—Paul P. Gordon
*Assistant Examiner*—Paul Rodriguez
(74) *Attorney, Agent, or Firm*—Fulbright & Jaworski, LLP (57) ABSTRACT

The invention comprises in various embodiments controllers and apparatus for testing flexible manufacturing systems and methods of operating same. The controller includes a computer, a program, output lines from the computer, and devices connected to the output lines. The program uses matrix logic equations to determine when to start and stop jobs. The devices start and stop individual resources in response to logic signals from the computer. In one embodiment, the controller obtains sensor feedback on the distribution of work pieces and available resources in the manufacturing system. The invention also includes an apparatus and methods for testing a flexible manufacturing system. In response to the input of initial data, the apparatus for testing a flexible manufacturing system solves matrix equations and determines the activity and/or production of the manufacturing system. The apparatus for testing a flexible manufacturing system sends logical signals to a recording device which, in one embodiment, produce a cumulative display of the time dependent production or activity of the system.

31 Claims, 6 Drawing Sheets

U.S. PATENT DOCUMENTS

| | | | | |
|---|---|---|---|---|
| 5,555,179 | * | 9/1996 | Koyama et al. | 700/95 |
| 5,701,439 | * | 12/1997 | James et al. | 703/17 |
| 5,706,200 | * | 1/1998 | Kumar et al. | 700/100 |
| 5,745,390 | * | 4/1998 | Daneshgari | 702/119 |

OTHER PUBLICATIONS

Chen, C.L.P. and Wichman, C., A Clips Rule–Based Planning System for Mechanical Assembly, *Proc. NSF DMS Conf.*, pp. 837–841, Atlanta 1992.

David, R. and Alla, H., Petri Nets for Modeling of Dynamic Systems–A Survey, *Automatica*, vol. 30, No. 2, pp. 175–202, 1994.

Eppinger, S.D., Whitney, D.E., and Smith, R.P., Organizing the Tasks in Complex Design Projects, Proc. ASME International Conference Deisgn Theory and Methodology, pp. 39–46, Sep. 1990.

Gracanin, D., Srinivasan, P. and Valavanis, K., Parameterized Petri Nets: Properties and Applications to Automated Manufacturing Systems, Proc. IEEE Mediterranean Symposium New Directions in Control and Automation, pp. 48–55, Jun. 1994.

Graves, S.C., A Review of Production Scheduling, *Operations Research*, vol. 29, pp. 646–675, Aug. 1981.

Huang, H.H., Lewis, F.L., Pastravanu, O.C. and Gürel, A., Flow–Shop Scheduling Design in an FMS Matrix Framework, *Control Engineering Practice*, vol. 3, No. 4, pp. 561–568, 1995.

Jeng, M.D. and DiCesare, F., A Synthesis Method for Petri Net Modeling of Automated Manufacturing Systems with Shared Resources, Proc. IEEE Conference Decision and Control, pp. 1184–1189, Dec. 1992.

Kasturia et al., Real Time Control of Multilevel Manufacturing Systems Using Colored Petri Nets, IEEE Conference, pp. 1114–1119, 1988.

Kumar, P.R. and Meyn, S.P., Stability of Queueing Networks and Scheduling Policies, Proc. IEEE Transactions on Automatic Control, vol. 40, No. 2, pp. 251–260, Feb. 1995.

Kumar, P.R. and Meyn, S.P., Stability of Queueing Networks and Scheduling Policies, Proc. IEEE Conference Decision and Control, pp. 2730–2735, Dec. 1993.

Leung, Y.T. and Suri, R., Performance Evaluation of Modeling of Discrete Manufacturing Systems, *IEEE Control Systems Magazine*, pp. 77–86, Jun. 1990.

Lewis, F.L., Pastravanu, O.C. and Huang, H.H., Controller Design and Conflict Resolution For Discrete Event Manufacturing Systems, Proc. IEEE Conference Decision and Control, pp. 3288–3293, San Antonio, Dec. 1993.

Lu, S.H. and Kumar, P.R., Distributed Scheduling Based on Due Dates and Buffer Priorities, *IEEE Transactions on Automatic Control*, vol. 36, No. 12, pp. 1406–1416, Dec. 1991.

Luh, P.B. and Hoitomt, D.J., Scheduling of Manufacturing Systems Using the Lagrangian Relaxation Technique, *IEEE Transactions on Automatic Control*, vol. 38, No. 7, pp. 1066–1079, Jul. 1993.

Murata, T., Komoda, N., Matsumoto, K. & Haruna, K., A Petri Net–Based Controller for Flexible and Maintainable Sequence Control and its Applications in Factory Automation, *IEEE Transactions on Industrial Electronics*, vol. IE–33, No. 2, pp. 1–8, Feb. 1986.

Negretto, U., Control of Manufacturing Ssytems, *Intel Design & Manufacturing*, 1991.

Ramadge, P.J.G., Wonham, W.M., The Control of Discrete Event Systems, *Proc. IEEE*, vol. 77, pp. 81–98, 1989.

Ramaswamy, S., Valavanis, K.P., Srinivasan, P. and Steward, A., A Coordination Level H–EPN Based Error Recovery Model for Hierarchical Systems, Proc. IEEE Mediterranean Symposium New Directions in Control and Automation, pp. 56–61, Jun. 1994.

Srihari, K., Emerson, C.R. and Cecil, J.A., Modeling Manufacturing with Petri Nets, *CIM Review*, pp. 15–21, Spring, 1990.

Steward, D.V., On An Approach to Techniques for the Analysis of the Structure of Large Systems of Equations, *SIAM Review*, vol. 4, No. 4, Oct. 1962.

Tacconi, D.A. and Lewis, F.L., Simulation Schemes of Discrete Event Systems, *IEEE Control Systems Magazine*, pp. cover page, 1–12, Jun. 18, 1996.

Tacconi, D.A., Lewis, F.L. and Huang, H.H., Modeling and Simulation of Discrete Event Systems using a Matrix Formulation, *IEEE Control Systems*, pp. cover page, 590–594, Jun. 10–13, 1996.

Tacconi, D.A. and Lewis F.L., A New Matrix Model for Discrete Event Systems: Application to Simulation, *IEEE Control Systems*, pp. 62–71, Oct. 1997.

Teng, S.H. and Black, J.T., Cellular Manufacturing Systems Modeling: The Petri Net Approach, *Journal of Manufacturing Systems*, vol. 9, No. 1, pp. 45–54, 1990.

Warfield, J.N., Binary Matrices in System Modeling, *IEEE Transactions on Systems, Man, and Cybernetics*, vol. SMC–3, No. 5, pp. 441–449, Sep. 1973.

Zhou, M.C., Deadlock Avoidance Schemes in a Distributed Robotic System: Petri Net Modeling and Analysis, *Journal of Robotic Systems*, vol. 12(3), pp. 177–187, 1995.

Zhou, M.C. McDermott, K., and Patel, P.A., Petri Net Synthesis and Analysis of a Flexible Manufacturing System Cell, *IEEE Transactions on Systems, Man, and Cybernetics*, vol. 23, No. 2, Mar. 1993.

Ziegler, B.P., DEVS Representation of Dynamical Systems: Event–Based Intelligent Control, *Proc. of the IEEE*, vol. 77, No. 1, pp. 72–80, Jan. 1989.

* cited by examiner

METHOD AND APPARATUS FOR TESTING AND CONTROLLING A FLEXIBLE MANUFACTURING SYSTEM

This application claims the benefit of U.S. Provisional Application No. 60/047,985 filed on May 28, 1997.

BACKGROUND OF THE INVENTION

1. Field of the Invention

This invention relates generally to manufacturing systems and assembly lines, and more particularly, to methods and apparatus for designing and controlling the operation of flexible manufacturing systems and assembly lines.

2. Description of the Related Art

Some structures and concepts that are useful for describing manufacturing systems are defined as follows:

Work pieces are objects and materials that are changed and combined to make a finished product;

Jobs are operations that change or combine the work pieces;

Resources are machines, humans with tools, fixtures, transport devices, and buffers that perform the jobs on the work pieces;

Assembly line is a circuit that the work pieces follow between the resources that perform the jobs;

Workcell is a physical portion of the manufacturing system; and

Flexible manufacturing systems (FMS) are assembly lines or workcells, wherein the timing of the jobs or assignment of the resources is flexible.

The design and operation of a workcell involves two steps. First, decisions are made on the sequencing of jobs to be performed on individual work pieces. Normally, the job sequence is based on, at least, some considerations external to the form of the workcell. Second, decisions are made on the control of the workcell that will perform the predetermined job sequence. These control decisions involve the assignments of particular resources to the jobs of the predetermined sequence. The control decisions entail starting jobs and releasing resources when jobs are done. The control decisions may also entail choosing among different resource assignment possibilities when several resources can perform a job, and resolving priorities when several jobs are simultaneously assigned to the same resource.

Figure 1:
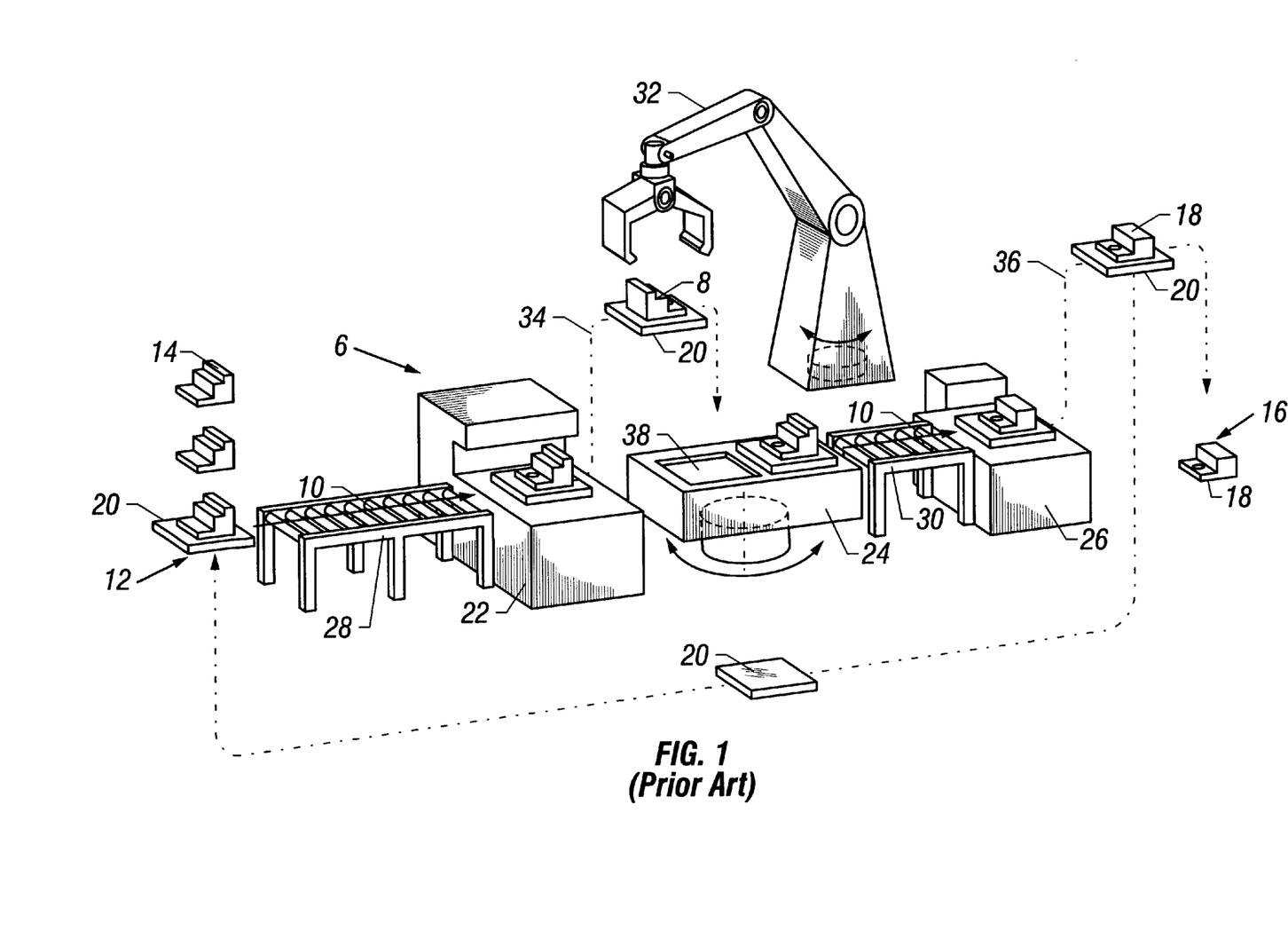
FIG. 1 illustrates a simple flexible manufacturing system.

FIG. 1 shows a simple workcell 6 whose operation involves such control decisions. Work pieces 8 follow a fixed circuit 10 from an input 12 for raw work pieces 14 to an output 16 for finished products 18. At the input 12, the raw work pieces 14 are attached to pallets 20 that facilitate handling. The pallets 20 are removed from the finished products 18 at the output 16 and automatically returned to the input 12. First and second machines 22, 26 perform jobs. For example, the first and second machines 22, 26 may drill holes and cut the work pieces 8, respectively. The input of the second machine 26 is a buffer 24 that can hold up to two work pieces 8 simultaneously. The raw work pieces 14 are moved automatically from the input 12 to the first machine 22, and from the buffer 24 to the second machine 26 by conveyers 28, 30. A robot arm 32 transports the work pieces 8 from the first machine 22 to the buffer 24 and from the second machine 26 to the output 16. The resources of the workcell 6 of FIG. 1 are the first and second machines 22, 26, the buffer 24, the robot arm 32 and the pallets 20.

Though the illustrative workcell 6 of FIG. 1 is simple, its operation involves non-trivial control decisions. First, the robot arm 32 performs several jobs 34, 36. The first job 34 is to transport the work pieces 8 from the first machine 22 to the buffer 24, and the second job 36 is to transport the work piece 8 from the second machine 26 to the output 16. The first and second jobs 34, 36 of the robot arm 32 are mutually exclusive, i.e. cannot be performed simultaneously. Thus, the operation of the robot arm 32 can encounter conflict situations where both the first and second jobs are requested simultaneously. Second, the buffer 24 and pallets 20 are resources in multiple copies. The buffer 24 has two spaces 38 for holding the work pieces 8, and there are several pallets 20. Multiple copies complicate controlling the assignment of the resources to the jobs. The multiple job and multiple copy resources introduce flexibility into the control decisions and make the workcell 6 of FIG. 1 a FMS.

A FMS is a discrete event (DE) system. DE systems are defined by a set of event-states and transitions between the event-states. In the workcell of a manufacturing system, the event-states are the states of the resources, i.e., rest states and job performance states, the inputs for raw work pieces and outputs for finished products. The transitions are the acts of starting and stopping resources, i.e., transitions from rest states to job performance states and vice versa. The transitions involve the substantially simultaneous movement of the work pieces between inputs, resources, and outputs. The event-states and transitions of the DE system can be represented by a directed graph or Petri net (PN). In the PN, the event-states and transitions are represented by circles and vertical lines respectively. Directed lines indicate the transitions of the work pieces and of the resources between the event-states. The event-states and transitions alternate along the directed lines of the PN. While the resources of the workcell occupy two types of event-states, rest event-states and job event-states, the work pieces only occupy the job event-states, inputs or outputs.

Figure 2:
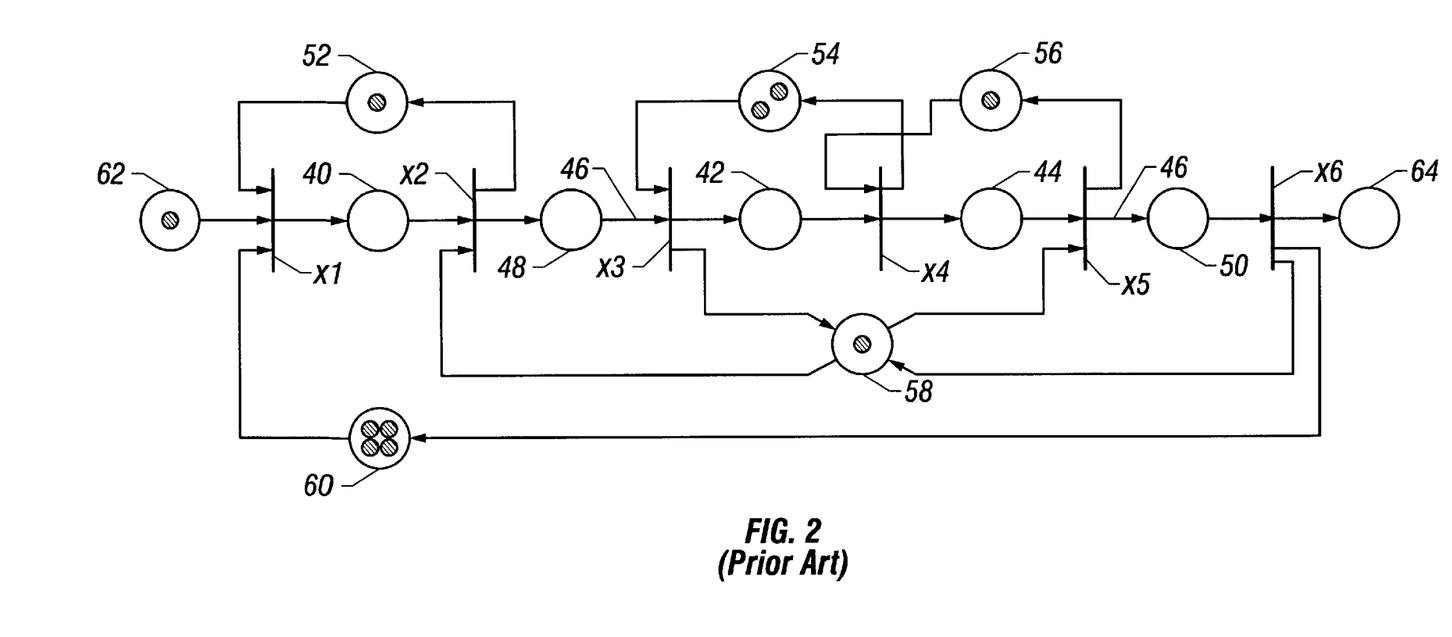
FIG. 2 is a Petri net representation of the flexible manufacturing system of FIG. 1.

FIG. 2 is the PN of the FMS of FIG. 1. The job event-states of the first machine 40, buffer 42, and second machine 44 lie along a straight line 46 representing the circuit of work pieces 8 of FIG. 1. The robot arm 32 has both first and second job event-states 48, 50 along the same straight line 46. The rest event-states of the first machine 52, buffer 54, second machine 56, and robot arm 58 are off the circuit 46 of work pieces 8. The job event-states of the pallets are the job event-states of the other resources 40, 42, 44, 48, 50, because the work pieces 8 are attached to the pallets 20 while moving along the circuit 46. The pallets have a rest event-state 60 between the first transition x1 after the input event-state 62 and the last transition x6 before the output event-state 64. At these two transitions x1, x6, the pallets 20 are attached and removed respectively from the work pieces 8.

In a PN, the time dependent occupation of the event-states by resources is indicated by marking the circles representing the event-state with dots. At the time represented by FIG. 2, the workcell 6 of FIG. 1 has four pallets 60, one first machine 52, two buffer spaces 54, one robot arm 58, and one second machine 56 occupying rest event-states 60, 52, 54, 58, 56. At the same time, there is one raw work piece 14 of FIG. 1 at the input event-state 62. The work pieces 14 make transitions x1–x6 between job event-states along the directed circuit 46. The pallets 20 of FIG. 1 make transitions between different job event-states x2–x5 except for transitions x1, x6 at the input 62 and output 64, which are transitions between rest and job event-states 60, 40, 50. The other resources only make transitions between job and rest event-states. Time dependent transitions between event-states ordinarily change the markings, e.g., occupations, of the circles of the PN.

Since PN's faithfully represent all event-states, the prior art has employed PN's to the design and to analyze the operation of FMS's. The prior art use of PN's to design controllers of workcells had limitations. First, the analysis of practical FMS's through PN's is complicated. For designing automated controllers, simpler techniques are preferable. Second, the PN technique requires a separate graph to represent each time state of the workcell. Thus, PN's do not present a straightforward method for analyzing the time evolution of the workcell. Automated controllers cannot simply determine from a PN how to operate the workcell. Third, the prior art based the design and control of PN's on "top-down" and "bottom-up" designs by using rules such as series mutual exclusion, parallel mutual exclusion, and forbidden states of resource allocation. These rules do not guarantee that a global evolution is operative, i.e. absence of deadlock. In the prior art, PN design was supplemented with simulations to insure that the workcell would not evolve into an inoperative or deadlocked state.

Though the prior art has been illustrated by the simple example of FIGS. 1–2, the difficulties of constructing simple rules for controller operation ordinarily reappear in more complex FMS's. To operate controllers of FMS's in an automated mode, it would be useful to have a more straightforward representation for the time evolution of workcell.

The present invention is directed to overcoming, or at least reducing the effects of, one or more of the problems set forth above.

SUMMARY OF THE INVENTION

In one aspect of the present invention, a program storage device readable by a computer, tangibly embodying a program of instructions for controlling a workcell is provided. The program has a timed control cycle, and the instructions are executable by the computer to perform method steps. The instructions include steps for solving a first matrix logic equation to determine a transition vector from a status vector of the workcell, determining a start vector of the workcell by using the transition vector to solve a second matrix equation, and sending a logic signal for at least one component of the start vector to an output port of the computer. The method updates the status vector and repeats the steps in each of the control cycles that is a complete control cycle.

In a second aspect of the present invention, a program storage device readable by computer, tangibly embodying a program of instructions for simulating a flexible manufacturing system is provided. The program has a timed control cycle and the instructions are executable by computer to perform method steps. The instructions include steps for determining a status vector from an initial marking vector of said flexible manufacturing system; solving a first matrix logic equation to determine a transition vector from activity completion matrix data and the status vector data; calculating a new marking vector from the transition vector, the initial marking vector, the activity completion matrix data, and activity start matrix data by solving a standard matrix equation; and sending at least one logic signal to an output port of the computer. The instructions include updating the initial marking vector by replacement with the new marking vector after the steps for solving and calculating. The program repeats the steps in each control cycle.

BRIEF DESCRIPTION OF THE DRAWINGS

Other objects and advantages of the invention will become apparent upon reading the following detailed description and upon reference to the drawings in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Specific embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The specific embodiments are apparatus and methods for controlling a flexible manufacturing system (FMS) and an apparatus for testing a FMS. The apparatus and method provide for control of a workcell as a function of time. The apparatus and method use matrix logic equations to process data on the event-states of the associated Petri nets (PN's) and to provide rules for the assignment of resources and work pieces to future event-states corresponding to yet to be performed jobs.

The specific embodiments are based on several objects that simply and quantitatively characterize the Petri nets (PN) associated to the workcell. With the exception of the marking vector, the components of these objects are logical variables, i.e., 0 and 1. The objects are defined below. The first six objects describe relations between event-states and transitions of the Petri net. These objects are not dependent on the time dependent condition of the workcell. The last four objects describe occupations of transitions and event-states of the PN's. These objects are functions of the time dependent state of the workcell.

Bill of Materials ($F_u$) is a matrix telling the number of raw work pieces of type j needed to make the next work piece. A value of logic 1 in the (i,j) entry of $F_u$ means that work piece j is needed for the transition of the PN. Since $F_u$ is usually sparse, control apparatus and methods may not store $F_u$ as a matrix data structure to save space.

Job sequencing matrix ($F_v$) contains information on the prior sequence of jobs performed on the work pieces. An entry of logic 1 in the (i,j) position of the $F_v$ matrix indicates that job event-state j is a prerequisite for transition i of the PN. A lower triangular $F_v$ matrix leads to a causal ordering of jobs.

Resource requirements matrix ($F_r$) has information on which resources perform the next job. An entry of logic 1 in the (i,j) position indicates that the rest event-state j precedes the transition i of the PN. The $F_r$ matrix forms the basis for assigning the resources to jobs.

Release matrices ($S_v$, $S_r$, and $S_y$) define which new jobs are started; resources are released, e.g., jobs are stopped; and final products are sent to the output by a control decision. An entry of logic 1 in the (i,j) entry of $S_v$ or $S_r$ respectively indicates that the job event-state i or the rest event-state i follows the transition j of the PN. An entry of logic 1 in the (y,j) entry of $S_y$ indicates that a finished work piece will be sent to the output after transition j.

Activity completion matrix [$F_u$, $F_v$, $F_r$, $F_y$] is a large matrix which defines the transitions that will occur due to presence of: raw work pieces at the inputs, currently occupied job event-states and currently occupied rest event-states. The next transitions are found by logical right multiplication of the negation of the activity completion matrix by the logical negation of status vectors as is shown below in equation (1). $F_y$ is a zero vector.

Activity start matrix $[S^T_u, S^T_v, S^T_r, S^T_y]^T$ is a large matrix that defines: vectors for jobs to start, resources to be made available and finished products to be sent to the output after the present control decisions. The activity start matrix is right logically multiplied by the transition vector to obtain the start vectors as is shown below in equations (2)–(4). $S^T_u$ is a zero vector.

Transition vector (x) describes the transitions that occur in the PN associated with the immediately prior state of the workcell. A logic value of 1 in entry j means that the controller orders the transition j immediately after the previous state of the PN.

Status vectors (u, $v_c$, and $r_c$) contain information on raw work pieces at the input, running jobs, and available resources previously. An entry of logic 1 in a component of the respective vector indicates a raw work piece was at the input, a job event-state was occupied, and a rest event-state was occupied prior to the present transition of the PN.

Start vectors ($R_S$, $V_s$, and y) contain information on resources to be made available, jobs to start, and finished products to the output due to an order from the controller. Here, $R_S$, $V_s$, and y are future event-state vectors. An entry of 1 in a component of the respective vector indicates a future rest event-state, e.g., resource to be turned off; a future job event-state, e.g., resource to be turned on; or a finished product to send to the output after the present transition of the PN.

Marking vector (m(s)) describes the assignment of the resources and work pieces to event-states of the Petri net (PN). Thus, $m(s)=[m(s_1), m(s_2), \ldots, m(s_q)]^T$ is the vector of occupation numbers of the event-states, i.e., $s=[s_1, s_2, \ldots s_q]^T$. The marking vector contains occupation numbers as opposed to logic variables. Since the assignment of resources and work pieces evolves with time, the marking vector describes the evolving configuration of the marking dots on a Petri net, e.g., the PN of FIG. 2.

The illustrative embodiments utilize the rules of a DE model as the basis of operation and control decisions on the assignment of resources, dispatch of work pieces, and the resolution of job performance conflicts. The time evolution of the DE model is described by matrix logic equations which have been mentioned in the above definitions. The matrix equations describe the transitions from and to occupied event-states in the PN associated with the workcell. The time evolution equations of the PN are:

Matrix DE Model State Equation $\bar{x}=F_v \bar{v}_c + F_r \bar{r}_c + F_u \bar{u} + F_D \bar{u}_D$ (1)

Job Start Equation $V_s = S_v x_1$ (2)

Resource Release Equation $R_S = S_r x_1$ (3)

Product Output Equation $y = S_y x$. (4)

The objects of the matrix equations (1)–(4) have logical variables as components. The logic vectors recursively define the activities of the workcell as an evolution of occupied event-state of the associated PN. In equations (1)–(4), the overbar means logical negation. In the following, logical negation is defined for positive integers as transforming the positive integers to zero. Under the logical negation, 1 and 0 transform into each other. The bilinear products in equations (1)–(4) are logical AND operations and all additions either explicit or implied by component sums are logical OR operations. Finally, logical negation is defined to interchange AND with OR.

Figure 3:
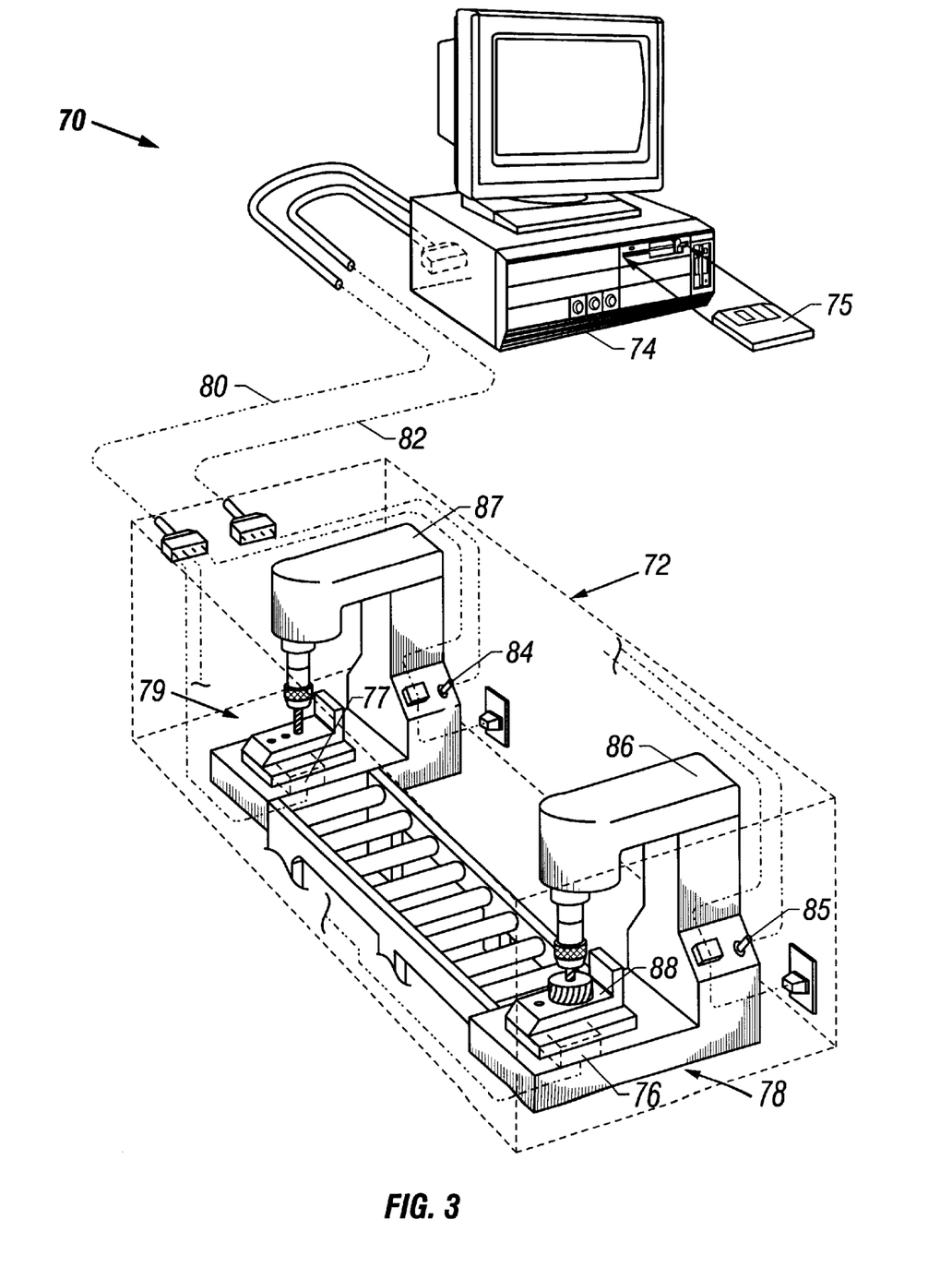
FIG. 3 illustrates a specific embodiment of the controller of a workcell.

FIG. 3 illustrates a specific embodiment of a controller 70 that operates a workcell 72. The controller 70 includes a computer or processor 74, a program 75, sensors 76, 77 input lines 80 to the computer or processor 74, and output lines 82 from the computer 74, and devices 84, 85 such as switches, motors, solenoids and the like, on the resources 86, 87. The sensor 76 provides logic data, e.g., the status vectors u, $v_c$, and $r_c$, on the presence of a work piece 88 and the state of the resource 86 at location 78 in the workcell 72. The sensor 76 may be a simple device for converting mechanical or electrical data into logical signals. The devices 84, 85 operate the individual resources 87, 86. The devices 84, 85 start and stop the jobs of the resources 86, 87 in response to logic signals from the output lines 82 of the computer or processor 74. In one construction, the devices 84, 85 are electronic switches operated by logic gates (not shown) that receive the logical signals from the output lines 82. The construction of the sensors 76 and devices 84, 85 is straight-forward to an ordinary worker in the art in light of the above disclosure.

There are two specific embodiments of the controller 70. The first embodiment is shown in FIG. 3. In this embodiment, the controller 70, receives feedback information on the workcell 72 from the sensors 76, 77 via the input lines 80. The controller 70 is self-correcting and can operate the workcell 72 from any initial state. In a second embodiment, the controller 70 does not contain the input lines 80 or the sensors 76 of FIG. 3. In this embodiment, the program 75 of the controller 70 operates the workcell 72 from one known or chosen initial state. In this embodiment, the initial state ordinarily only has work pieces 88 at the inputs (not shown) and has all resources 86 initially turned off. The second embodiment does not employ self-correction of the controller 70.

Figure 4:
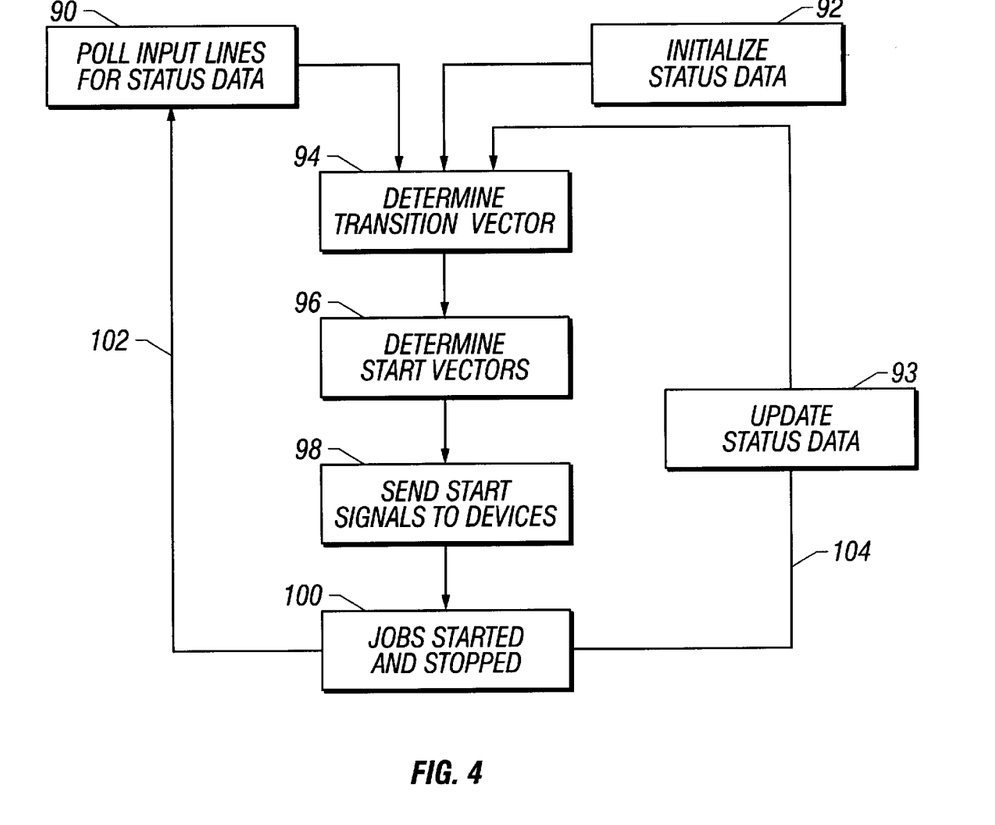
FIG. 4 is a block diagram showing the operation of the specific embodiment of FIG. 3.

FIG. 4 illustrates the operation of the specific embodiments of the controller 70 of FIG. 3. At block 90, the control cycle of the first embodiment starts with the computer or processor 74 polling the input lines 80 from the locations 78, 79 in the workcell 72. The polling data consists of the status logic vectors $v_c$, $r_c$, and u. In the second embodiment, the computer or processor 74 starts the operation cycle by determining the status logic vectors $v_c$, $r_c$, and u. At block 92, this embodiment of the computer or processor 74 initializes the status logic vectors $v_c$, $r_c$, and u before the first control cycle. The initialization may be done with known data in the program 75 or with initial data supplied by an operator. At block 93, a subroutine, in the program 75 updates the status logic vectors for subsequent control cycles. If components of the status vector indicate that jobs were running or resources were available, and the corresponding components of the start vector indicate that the jobs were stopped, or that the available resources were assigned to jobs, the respective components of the status vectors are negated. The remainder of the control cycle of both embodiments is substantially identical. At block 94, the computer or processor 74 determines the transition vector x from the status vectors $v_c$, $r_c$ and u, and equation (1). Next, at block 96, the computer or processor 74 determines the start vectors $V_s$, $R_S$, and y from equations (2)–(4) and the transition vector x. Next, at block 98, the computer or processor 74 sends logic signals for the start vectors $V_s$, $R_S$, and y to the devices 84, 85 that operate the individual resources 87, 86. At block 100, the operating devices 84, 85 start jobs, stop jobs, and send finished products to the output (not shown in FIG. 3) in response to receiving the logic signals.

The program 75 has instructions that define a time for each control cycle. In the first embodiment, the computer or processor 74 begins the next control cycle 102 by polling 90 the input lines 80 again. In the second embodiment, the computer or processor 74 begins the next control cycle 104 by updating the status vectors $v_c$, $r_c$ u at block 93. The control cycle repeats for as long as the workcell 72 is operated.

The program 75 needs the $F_u$, $F_v$, $F_r$, $S_v$, $S_r$, and $S_y$ matrices to solve for the transition and start logic vectors. The F and S matrices are inherently defined for each workcell 72. In view of the above definitions, a person of average skill in the art can determine F and S without undue experimentation, by constructing the Petri net associated with any selected workcell. A person of ordinary skill in the art can also write the program 75, which solves logical equations (1)–(4) for the transition and start logic vectors of the selected workcell in light of the above definitions.

Since the F and S matrices are sparse and the DE equations (1)–(4) are straightforward, the computer or processor 74 of the controller 70 can be a personal computer. The sparse activity start and completion matrices are not stored in matrix form on the personal computer in one embodiment. An embodiment based on a personal computer can operate large flexible manufacturing systems.

The equations (1)–(4) can be solved, for example, with the Rete algorithm. The program 75 can be written in a variety of languages such as MATLAB, MATRIX$_X$, C or other languages known in the art. The language and the algorithm used to solve equations (1)–(4) of the program are not essential to the present invention. A controller 70 can generally be adapted for different workcells 72 by introducing multiplexers on outputs and inputs and replacing the S and F matrices of the program 75 by those appropriate for the workcell 72 being operated.

Figure 5:
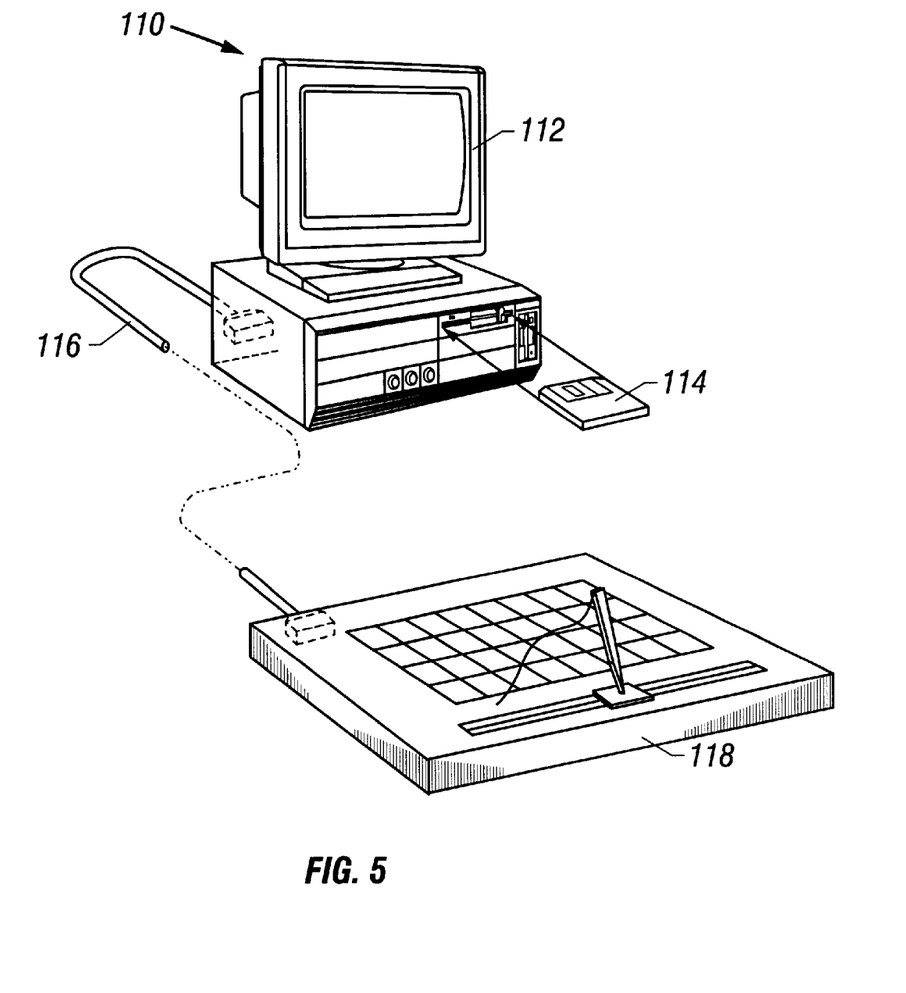
FIG. 5 illustrates an embodiment for an apparatus for testing a flexible manufacturing system.

FIG. 5 illustrates an apparatus 110 for designing and testing a hypothetical flexible manufacturing system (not shown) that will be operated according to the embodiments shown in FIGS. 3–4. The apparatus for designing and testing 110 enables one to modify the design and the performance of a FMS without first making the hypothetical workcell or controller. The apparatus for designing and testing 110 includes a computer or processor 112 having a program 114, output lines 116, and a recording device 118. The apparatus for testing 110 allows one to test and improve the controller of particular FMS's before investing in the construction of the hypothetical workcell, e.g., the workcell 72 of FIG. 3.

In one embodiment, the recording device 118 is an accumulator that sums the start vector y and plots the result for the sum as a function of time. In this embodiment, the recording device 118 displays the number of finished products made by the hypothetical FMS. In alternate embodiments, the recording device 118 accumulates and displays time sums and components of the marking vector. Time sums of components of the marking vector give, for example, the percentage utilization of individual resources when divided by total times.

In other embodiments, the recording device 118 can be replaced by any suitable medium for recording one or more components of the marking vector or sums thereof as a function of the number of control cycles of the hypothetical FMS. Suitable recording devices include plotters, memory storage devices, cathode ray displays and any of the above recording devices supplemented by a time accumulator which sums individual components of the marking vector before recording. The recording device 118 can be any useful means for recording time dependent data or displaying at least one component of the marking, status, or start vectors.

Figure 6:
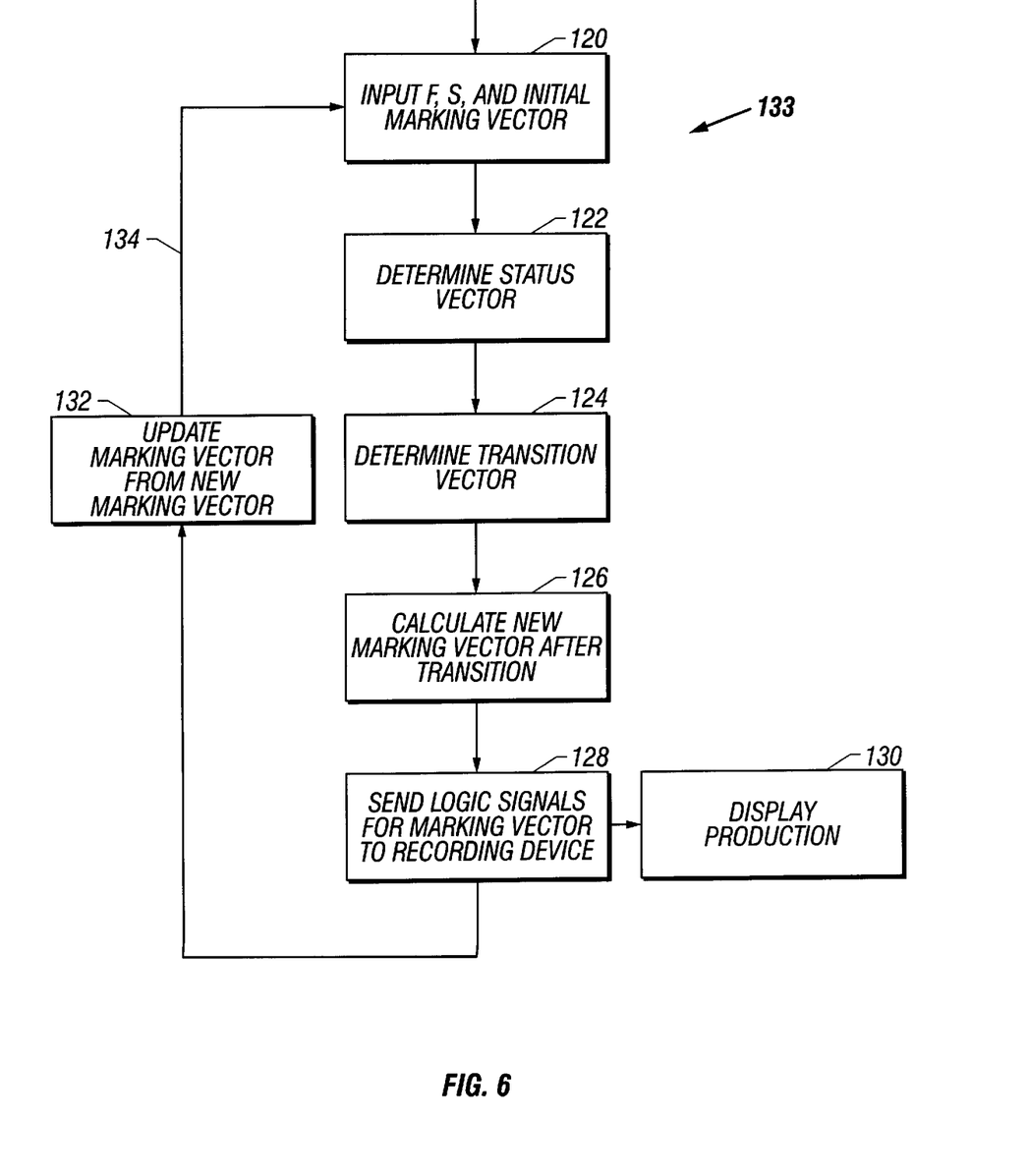
FIG. 6 is a block diagram illustrating the method for testing a flexible manufacturing system with the apparatus for testing of FIG. 5.

FIG. 6 is a block diagram illustrating a method 133 for testing a hypothetical workcell, e.g., the workcell 72 of FIG. 3, and a controller, e.g., the controller 70 of FIG. 3, with the apparatus for designing and testing 110 of FIG. 5. The apparatus for designing and testing 110 of FIG. 5 tests the hypothetical workcell by displaying the time evolution of components of the marking vector, i.e. $m_k(s)$. The marking vector describes the occupation of event-states s of the PN associated with the hypothetical workcell. At block 120, the method for testing 133 requires an operator (not shown) to supply data on the hypothetical FMS to the computer 112 of FIG. 5. The essential physical data are the hypothetical F and S matrices and initial marking vector, $m_k(s)$ of the hypothetical workcell. The F and S matrices determine how the hypothetical controller will operate. In one embodiment, an operator inputs different physical data, at block 120, and compares the outputs of finished products as displayed by the recording device. By varying the physical data inputted into the apparatus for designing and testing 110 of FIG. 5, the operator can determine physical characteristics for the hypothetical controller that optimize production.

Referring to FIG. 6, the program 114 of FIG. 5 employs the activity completion matrix, F, and the activity start matrix, S, to determine the time evolution of the marking vector $m_k(s)$. F and S describe the outflow and inflow of work pieces and resources from and to event-states of the PN. Thus, $S-F^T$ gives the conservation law for the components of $m_k(s)$. The conservation law is defined by the following evolution equation $$m_{k+1}(s)=m_k(s)+[S-F^T]x_k, \quad (5)$$

wherein k and k+1 are the times of event-states before and after one transition ordered by the hypothetical controller (not shown). Since the marking vectors $m_k(s)$ take positive integer values, equation (5) is a standard matrix equation and not a logic matrix equation. At block 126, the computer 112 recursively solves this equation to calculate a new marking vector, e.g., $m_{k+1}(s)$, for each control cycle.

Referring to FIGS. 5 and 6, to solve equation (5), the programmed computer 112 needs the initial marking vector $m_k(s)$ and transition vector $x_k$. The components of $\overline{m_k}(s)$ are equal to $(u, v_c, r_c, y)^T$ in an appropriate arrangement of the event-states in s, i.e. s=(input, job event-states, rest event-states, output). Thus, at block 122, the program 114 determines the initial status vector $(u, v_c, r_c)$ directly from the inputted data. Logical negation, e.g., the overbars, transform positive components of $m_k(s)$ to zero. At block 124, the computer 112 uses $\overline{m_k}(s)$ and equation (1) to determine the initial transition vector $x_k$. The logically negated form of equation (1) has OR and AND operations interchanged. At block 126, the programmed computer 112 calculates the new marking vector from $x_k$ and equation (5). The components of the new marking vector, e.g., $m_{k+1}(s)$, contain the effects of the operation of the hypothetical workcell during one control cycle. At block 128, the computer or processor 112 sends logical signals for components of $m_{k+1}(s)$ to the recording device 118. In one embodiment, sends the component of $m_{k+1}(s)$ corresponding to the number of finished products to the recording device 118 at block 128. At block 130, the recording device 118 displays the production. At block 132, the apparatus for testing 110 updates the initial marking vector with the new marking vector so that the marking vector of the next control cycle corresponds to the hypothetical workcell with occupations of event-states given by the new marking vector. Then, the apparatus for testing repeats the above steps to simulate the hypothetical workcell for a preselected number of control cycles along the arrow 134. In light of the above disclosure, a person of ordinary skill in the art can write the program 114 for the computer or processor 112 without undue experimentation.

Referring to FIGS. 5–6, the prior art workcell 6 of FIGS. 1–2 can be used to illustrate the operation of the apparatus for designing and testing 110 as illustrated in FIG. 6. In FIG. 2, the Petri net has an initial event-state vector $s_k$, wherein $s_k$=(input 62, job state of first machine 40, first job state of robot arm 48, job state of buffer 42, job state of second machine 44, second job state of robot arm 50, rest state of pallets 60, rest state of first machine 52, rest state of second machine 56, rest states of buffer 54, rest state of robot arm 58, output 64)$^T$. From the PN of FIG. 2, the associated initial marking or occupation vector is defined by: $m_k(s)^T$=(1,0,0, 0,0,0,4,1,1,2,1,0). At block 120, the initial marking vector is provided to the apparatus for designing and testing 110 externally, e.g., by an operator. The activity completion and start matrices F and $S^T$ are data on the workcell 6 of FIG. 1 that also must be provided to the apparatus for designing and testing 110. A person of ordinary skill in the art can determine F and $S^T$ for a preselected FMS and preselected initial conditions. The apparatus for designing and testing 110 is initially provided with F and $S^T$ at block 120. At block 122, the programmed computer 112 reads the components of the status vectors from the marking vector. At block 124, the programmed computer 112 uses equation (1) and the double negation of the initial marking vector, i.e., $(u, v_c, r_c, 0)^T$, to find the initial transition vector $x_0$. For this example, the initial transition vector is:

$$\begin{bmatrix} x_{0,1} \\ x_{0,2} \\ x_{0,3} \\ x_{0,4} \\ x_{0,5} \\ x_{0,6} \end{bmatrix} = \begin{bmatrix} 1 & 0 & 0 & 0 & 0 & 0 & 1 & 1 & 0 & 0 & 0 & 0 \\ 0 & 1 & 0 & 0 & 0 & 0 & 0 & 0 & 0 & 0 & 1 & 0 \\ 0 & 0 & 1 & 0 & 0 & 0 & 0 & 0 & 0 & 1 & 0 & 0 \\ 0 & 0 & 0 & 1 & 0 & 0 & 0 & 0 & 1 & 0 & 0 & 0 \\ 0 & 0 & 0 & 0 & 1 & 0 & 0 & 0 & 0 & 0 & 1 & 0 \\ 0 & 0 & 0 & 0 & 0 & 1 & 0 & 0 & 0 & 0 & 0 & 0 \end{bmatrix} \oplus \begin{bmatrix} 1 \\ 0 \\ 0 \\ 0 \\ 0 \\ 0 \\ 4 \\ 1 \\ 1 \\ 2 \\ 1 \\ 0 \end{bmatrix}$$

$$= \begin{bmatrix} 0 & 1 & 1 & 1 & 1 & 1 & 0 & 0 & 1 & 1 & 1 & 1 \\ 1 & 0 & 1 & 1 & 1 & 1 & 1 & 1 & 1 & 1 & 0 & 1 \\ 1 & 1 & 0 & 1 & 1 & 1 & 1 & 1 & 1 & 0 & 1 & 1 \\ 1 & 1 & 1 & 0 & 1 & 1 & 1 & 1 & 0 & 1 & 1 & 1 \\ 1 & 1 & 1 & 1 & 0 & 1 & 1 & 1 & 1 & 1 & 0 & 1 \\ 1 & 1 & 1 & 1 & 1 & 0 & 1 & 1 & 1 & 1 & 1 & 1 \end{bmatrix} \oplus \begin{bmatrix} 1 \\ 0 \\ 0 \\ 0 \\ 0 \\ 0 \\ 0 \\ 1 \\ 1 \\ 1 \\ 1 \\ 0 \end{bmatrix} = \begin{bmatrix} 1 \\ 0 \\ 0 \\ 0 \\ 0 \\ 0 \end{bmatrix}$$

Next, at block 126, the apparatus for designing and testing 110 evolves $m_k(s)$ through one control cycle by solving equation (5). From $x_0$, $m_0(s)$, and equation (5), $m_1(s)$ is found to be:

$$m_1(s) = m_0(s) + [S - F^T]x_0$$

$$= \begin{bmatrix} 1 \\ 0 \\ 0 \\ 0 \\ 0 \\ 0 \\ 4 \\ 4 \\ 1 \\ 2 \\ 1 \\ 0 \end{bmatrix} + \begin{bmatrix} -1 & 0 & 0 & 0 & 0 & 0 \\ 1 & -1 & 0 & 0 & 0 & 0 \\ 0 & 1 & -1 & 0 & 0 & 0 \\ 0 & 0 & 1 & -1 & 0 & 0 \\ 0 & 0 & 0 & 1 & -1 & 0 \\ 0 & 0 & 0 & 0 & 1 & -1 \\ -1 & 0 & 0 & 0 & 0 & 1 \\ -1 & 1 & 0 & 0 & 0 & 0 \\ 0 & 0 & 0 & -1 & 1 & 0 \\ 0 & 0 & -1 & 1 & 0 & 0 \\ 0 & -1 & 1 & 0 & -1 & 1 \\ 0 & 0 & 0 & 0 & 0 & 1 \end{bmatrix} \cdot \begin{bmatrix} 1 \\ 0 \\ 0 \\ 0 \\ 0 \\ 0 \end{bmatrix} = \begin{bmatrix} 0 \\ 1 \\ 0 \\ 0 \\ 0 \\ 0 \\ 3 \\ 0 \\ 1 \\ 2 \\ 1 \\ 0 \end{bmatrix}.$$

In this example, the transition ordered by the hypothetical controller involves moving one raw work piece 14 and pallet 20 to the first machine 22 and the job event-state 40 and removing the pallet 20 and first machine 22 from the rest event-states 60, 52. After evolving the marking vector, the preferred apparatus for designing and testing 110 y, e.g., the last component of $m_1$ to the recording device 118, i.e., at block 128. The recording device 118 would show no finished products at the output after the first control cycle. The apparatus for designing and testing 110 would repeat these steps to find $x_2$ and $m_2$, after subsequent control cycles, and the recording device 118 would display the production, e.g., the summed values of y, by the workcell 6 of FIG. 1.

In workcells containing shared resources the controller preferably recognizes and resolves conflicts that occur when a resource is needed for two jobs simultaneously. The specific embodiment of FIG. 3 can incorporate elements to handle conflicts and avoid the related problem of deadlock. One embodiment, adds a subroutine to the program 75 to recognize conflicts and adds terms to equation (1) to effectuate dispatching of work pieces involved in conflicts. One such subroutine uses equation (5) to determine a trial $m_{k+1}(s)$ that would result from the start signal sent by the controller 70 of FIG. 3. A conflict occurs when the trial $m_{k+1}(s)$ contains negative components. When the subroutine recognizes a conflict, the controller 70 of FIG. 3 orders a dispatching step. The dispatching step assigns work pieces affected by the conflict to dispatched event-states $u_D$. Equation (1) is modified by the occupation of dispatched states $u_D$. Transitions and the assignment of jobs depend on a new logic matrix $F_D$. The particular choices for $F_D$ are dependent on the detailed form of the workcell and entail additions to the program 75 of FIG. 3. In light of the above disclosure, an ordinary person in the art would be able to incorporate dispatching subroutines in an embodiment for a controller without undue experimentation.

Variations exist for the priority rules that fix $F_D$ in real FMS's. In a FMS having one resource that performs two jobs, one subroutine, in MATLAB code, is:

```
MF(U_D1) = 1;
MF(U_D2) = 1;
IF ANY((MF − (F' * MULTOA(NOT(F), NOT(NOT(MF)))) )) < 0)
        MF(U_D1) = 0;
        MF(U_D2) = 1;
ELSE
        MF(U_D1) = 1;
        MF(U_D2) = 1;
END IF
X = MULTOA(NOT(F), NOT(NOT(MF)));
```

This construction for the subroutine checks for negative components in a marking vector MF. When a negative component is found, the dispatching priority rule is implemented with $F_D$.

Performing jobs in a real workcell takes a nonzero time interval. To account for finite times, a controller 70 of FIG. 3 can modify the start vector signals to account for times for jobs to be completed. Job completion times are accounted for by additions to the program 75 of FIG. 3. In one embodiment, the program 75 splits the j-th event-state into the two event-states called in- and out-event-states. The in- and out-event-states have respective marking vectors $m_i(s_j)$ and $m_o(s_j)$. The in-state is occupied immediately when a job starts. A transition to the out-state is made in the program after the completion time for the job. A subroutine for time delays determines when transitions occur from in- to out-states and makes these in-state to out-state transitions. The program 75 of FIG. 3 implements job-completion time delays by replacing equation (5) by:

$$m_o(k+1) = m_o(k) - F^T \cdot x(k).$$

$$m_i(k+1) = m_i(k) + S \cdot x(k).$$

The subroutine also has logic instructions for diagonal transitions from $m_o(k)$ to $m_i(k)$. The diagonal transitions are dependent on the actual job completion times in the FMS being operated. The program 75 of FIGS. 3–4 incorporates this modified evolution into equation (1) through the identifications $\overline{m}_o(k) = (u, v_c, r_c, -)^T$ and $\overline{m}_i(k+1) = (-, V_S, R_S, y)^T$. A person of ordinary skill in the art can write the additional steps in code for the program 75 of the controller 70 without undue experimentation disclosure in light of the above disclosure.

All the methods and apparatus disclosed and claimed herein may be made and executed without undue experimentation in light of this specification. While the apparatus and methods of this invention have been described in terms of specific embodiments, it will be apparent to those of ordinary skill in the art that variations may be applied to the methods and apparatus herein without departing from the concept, spirit, and scope of the invention. All such variations and modifications apparent to those of ordinary skill in the art are deemed to be within the spirit, scope, and concept of the invention as defined by the appended claims.

What we claim is:

1. A program storage device readable by a computer, tangibly embodying a program of instructions for controlling a workcell, said program having instructions for steps of a method, the instructions being executable by the computer, the method comprising:

solving a first matrix logic equation to determine a transition vector from a status vector of said workcell;

determining a start vector of said workcell by using said transition vector to solve a second matrix logic equation;

sending a logic signal for at least one component of said start vector to an output port of said computer; and updating said status vector using said start vector and repeating said acts in each cycle of said program.

2. The program storage device as set forth in claim 1, wherein said program further comprises:

polling at least one input port of said computer for logical sensor signals, said step for polling being performed at least once during each of said cycles; and updating said status vector with components of said logic sensor signals.

3. The program storage device as set forth in claim 2, wherein each of said logic sensor signals includes logical data selected form the group consisting of logical data that a work piece is present at a place, logical data that a job is being performed at said place, and logical data that a resource is available at said place.

4. The program storage device as set forth in claim 1, wherein said program comprises further steps for recognizing conflicts, said steps including first determining a trial new marking vector from said transition vector and an initial marking vector and then recognizing a conflict when at least one component of said trial new marking vector is negative.

5. A program storage device readable by a computer, tangibly embodying a program of instructions for simulating a flexible manufacturing system, said program having instructions for steps of a method, said instructions executable by the computer, the method comprising:

determining a status vector from an initial marking vector of said flexible manufacturing system;

solving a first matrix logic equation to determine a transition vector from activity completion matrix data and said status vector data;

calculating a new marking vector from said transition vector, said activity completion matrix data, said initial marking vector, and activity start matrix data by solving a standard matrix equation;

sending at least one logic signal to a recording device; and after the steps for solving and calculating, updating said initial marking vector by replacement with said new marking vector, said program repeating said steps.

6. The program storage device as set forth in claim 5, wherein said program further comprises a means for recognizing and resolving conflicts.

7. The program storage device as set forth in claim 6, wherein said means for recognizing conflicts includes further instructions of said program for first determining a trial new marking vector from said transition vector and an initial marking vector and then recognizing a conflict when at least one component of said trial new marking vector is negative.

8. The program storage device as set forth in claim 5, wherein said recording device is selected from the group consisting of a memory storage device, a cathode ray screen, and a plotter display.

9. An apparatus, for controlling a workcell comprising:

at least one output line for sending logic signals, said output line having first and second ends;

a computer, having a program executable on the computer and having at least one output port, said first end being attached to said output port, said program having instructions for steps of a method, the method comprising:

solving a first matrix logic equation to determine a transition vector from a status vector;

determining a start vector from said transition vector by solving a second matrix logic equation; and sending a logic signal for a component of said start vector to said output port, said program updating said status vector using said start vector and repeating said steps; and at least one device, said device being connected to said second end, said device for starting or stopping a job at a place in said workcell in response to logic signals received from said second end.

10. The apparatus as set forth in claim 9, further comprising:

at least one sensor, said sensor being located at said place to produce logic sensor signals;

an input line having first and second terminations, the first termination being attached to said sensor and the second termination being attached to an input port of said computer; and said method further comprising:

polling said input port at least once during each repetition of the steps of solving, determining and sending; and replacing said status vector with said logic sensor signal received at said input port.

11. The apparatus as set forth in claim 10, wherein said logic sensor signal includes data selected from the group consisting of logical data that a work piece is present at said place, logical data that a job is being performed at said place, and logical data that a resource is available at said place.

12. The apparatus as set forth in claim 9 wherein said device is an electric switch operated by at least one logical gate, the logic gate to operate the electric switch, in response to receiving said logical signal.

13. The apparatus as set forth in claim 9, further comprising a means for recognizing and resolving conflicts.

14. The apparatus as set forth in claim 13, wherein said means for recognizing conflicts includes further instructions of said program for first determining a trial new marking vector from said transition vector and an initial marking vector and then recognizing a conflict when at least one component of said trial new marking vector is negative.

15. The apparatus as set forth in claim 9, wherein said computer is a personal computer.

16. A method, for controlling a workcell comprising:

solving a first matrix logic equation to determine a transition vector from status vector data;

determining a start vector from said transition vector by solving a second matrix logic equation;

sending a logic signal to at least one device, said logic signal including at least one of the components of the start vector, starting or stopping at least one job at a place in said workcell with said device in response to receiving the logic signal; and updating said status vector using said start vector and repeating said steps for a preselected number of cycles.

17. The method as set forth in claim 16, further comprising steps for:

producing a second logic signal with a sensor located at said place;

sending said second logic signal to an input port of said device;

polling said input port at least once during each of said cycles; and wherein the step for updating uses said second logic signal.

18. The method as set forth in claim 17, wherein the step of producing said second logic signal includes producing a data signal selected from the group consisting of a logical data indicating that a work piece is present at said place, a logical data indicating that a job is being performed at said place, and a logical data indicating that a resource is available at said place.

19. The method as set forth in claim 16, wherein said step of starting or stopping is performed by at least one logic gate, the logic gate adapted to operate an electric switch in response to said logical signal, said electric switch adapted to turn on or off a resource at said place.

20. The method as set forth in claim 16, further comprising recognizing and resolving a conflict.

21. The method as set forth in claim 20, wherein said step of recognizing and resolving a conflict includes first determining a trial new marking vector from said transition vector and an initial marking vector and then recognizing a conflict when at least one component of said trial new marking vector is negative.

22. The method as set forth in claim 16, wherein said steps of solving, determining, sending, and repeating are performed by a computer.

23. An apparatus for testing a flexible manufacturing system comprising:

at least one output line, said output line having first and second ends;

a recording device having at least one input, said input connected to the second end of said output line;

a computer having a program executable encoded in a memory thereof, the computer having at least one output port, said program including instructions for steps of a method, the method comprising:

determining a status vector from an initial marking vector of said flexible manufacturing system;

solving a first matrix logic equation to determine a transition vector from activity completion matrix data and said status vector data;

calculating a new marking vector from said transition vector, said initial marking vector, said activity completion matrix data, and activity start matrix data by solving a standard matrix equation;

sending at least one logic signal to an output port of the computer, said logic signal being a component of the new marking vector; said first end being attached to said output port; and after the steps of solving and calculating, updating said initial marker vector by replacement with said new marking vector and repeating the steps of determining, solving, calculating, and sending.

24. The apparatus for testing a flexible manufacturing system as set forth in claim 23, wherein the recording device includes an accumulator that sums at least one component of said marking vector.

25. The apparatus for testing a flexible manufacturing system as set forth in claim 23, wherein said recording device is selected from the group consisting of a plotter, a cathode ray display, and a memory storage device.

26. The apparatus for testing a flexible manufacturing system as set forth in claim 23, further comprising means for recognizing and resolving a conflict.

27. The apparatus for testing a flexible manufacturing system as set forth in claim 26, wherein said means for recognizing and resolving a conflict includes instructions of said program for first determining a trial new marking vector from said transition and initial marking vectors and for then recognizing a conflict when at least one component of said trial new marking vector is negative.

28. The apparatus for testing a flexible manufacturing system as set forth in claim 23, wherein said computer is a personal computer.

29. A method for testing a flexible manufacturing system comprising:

solving a first matrix logic equation to determine a transition vector from an activity completion matrix data and an initial status vector data;

calculating a new marking vector from said transition vector, an initial marking vector, said activity completion matrix data, and an activity start matrix data by solving a standard matrix equation;

sending at least one logic signal to an input of a recording device, said logic signal including one or more components of said new marking vector; and after the steps of solving and calculating, using said new marking vector to update said status vector data and to replace said initial marking vector with said new marking vector, said program repeating said steps of solving, calculating, and sending.

30. The method for testing a flexible manufacturing system as set forth in claim 29, further comprising recognizing and resolving a conflict.

31. The method for testing a flexible manufacturing system as set forth in claim 30, wherein said step of recognizing and resolving a conflict includes first determining a trial new marking vector from said transition and initial marking vectors and then recognizing a conflict when at least one component of said trial new marking vector is negative.

* * * * *